(12) United States Patent
Yan et al.

(10) Patent No.: US 10,789,210 B2
(45) Date of Patent: Sep. 29, 2020

(54) METHOD, APPARATUS, AND SYSTEM FOR DATA DEDUPLICATION

(71) Applicant: EMC IP Holding Company LLC, Hopkinton, MA (US)

(72) Inventors: Bob Yan, Chengdu (CN); Bernie Hu, Chengdu (CN); Rui Liao, Chengdu (CN); Vincent Wu, Chengdu (CN); Jia Huang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 340 days.

(21) Appl. No.: 15/712,280

(22) Filed: Sep. 22, 2017

(65) Prior Publication Data

US 2018/0089218 A1    Mar. 29, 2018

(30) Foreign Application Priority Data

Sep. 23, 2016 (CN) .......................... 2016 1 0849588

(51) Int. Cl.
*G06F 16/00* (2019.01)
*G06F 16/174* (2019.01)
*G06F 3/06* (2006.01)

(52) U.S. Cl.
CPC .......... *G06F 16/1748* (2019.01); *G06F 3/061* (2013.01); *G06F 3/067* (2013.01); *G06F 3/0641* (2013.01); *G06F 3/0652* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 7,747,584 B1 * | 6/2010 | Jernigan, IV ....... | G06F 16/1748 707/692 |
| 8,195,636 B2 * | 6/2012 | Stager ................... | G06F 9/5022 707/662 |
| 8,412,682 B2 * | 4/2013 | Zheng ................... | G06F 3/0608 707/687 |
| 8,442,952 B1 * | 5/2013 | Armangau .......... | G06F 16/1752 707/686 |
| 8,620,973 B1 * | 12/2013 | Veeraswamy ......... | G06F 16/128 707/822 |
| 8,671,082 B1 * | 3/2014 | Yadav ................... | G06F 3/0641 707/692 |
| 9,298,726 B1 * | 3/2016 | Mondal ............... | G06F 16/1752 |

(Continued)

*Primary Examiner* — Debbie M Le
(74) *Attorney, Agent, or Firm* — BainwoodHuang

(57) ABSTRACT

The present disclosure provides a method, apparatus and system for data deduplication comprising setting, for a to-be-deduplicated data block, a pointer pointed to the to-be-deduplicated data block as a pointer pointed to a corresponding to-be-reserved data block, and setting a virtual pointer pointed to the to-be-deduplicated data block, cancelling, in response to an available storage capacity reaching a predetermined value, virtual pointers of respective to-be-deduplicated data blocks to be reclaimed, and reclaiming storage spaces of the respective to-be-deduplicated data blocks to be reclaimed, wherein when the virtual pointer pointed to the to-be-deduplicated data block is available, the to-be-deduplicated data block is directly accessed through the virtual pointer.

17 Claims, 13 Drawing Sheets

400 —

Setting, for a to-be-deduplicated data block, a pointer pointed to the to-be-deduplicated data block as a pointer pointed to a corresponding to-be-reserved data block, and setting a virtual pointer pointed to the to-be-deduplicated data block — 401

Cancelling, in response to an available storage capacity reaching a predetermined value, virtual pointers of respective to-be-deduplicated data blocks to be reclaimed, and reclaiming storage spaces of the respective to-be-deduplicated data blocks to be reclaimed, wherein when the virtual pointer pointed to the to-be-deduplicated data block is available, the to-be-deduplicated data block is accessed through the virtual pointer. — 402

(56) References Cited

U.S. PATENT DOCUMENTS

| | | | |
|---|---|---|---|
| 9,460,102 B1* | 10/2016 | Bono | G06F 16/1748 |
| 9,547,453 B2* | 1/2017 | Glazemakers | G06F 9/45558 |
| 9,875,271 B2* | 1/2018 | Saliba | G06F 11/1453 |
| 9,891,860 B1* | 2/2018 | Delgado | G06F 3/065 |
| 9,921,773 B2* | 3/2018 | Georgiev | G06F 16/1748 |
| 9,996,286 B2* | 6/2018 | Hayasaka | G06F 3/064 |
| 10,222,987 B2* | 3/2019 | Brosch | G06F 16/1748 |
| 10,635,323 B2 | 4/2020 | Yan et al. | |
| 2019/0332499 A1 | 10/2019 | Huang et al. | |

* cited by examiner

METHOD, APPARATUS, AND SYSTEM FOR DATA DEDUPLICATION

RELATED APPLICATIONS

This application claim priority from Chinese Patent Application Number CN201610849588.7, filed on Sep. 23, 2016 at the State Intellectual Property Office, China, titled "METHOD, DEVICE AND SYSTEM FOR DATA DEDUPLICATION" the contents of which is herein incorporated by reference in its entirety.

FIELD

Embodiments of the present disclosure generally relate to the field of data storage, and more specifically, to a method and apparatus for data deduplication.

BACKGROUND

"Deduplication" is a technique commonly used in data storage, with an aim to remove duplicate data in a storage area as much as possible so as to save storage space and enhance storage efficiency. The existing deduplication techniques adopt a virtual block management (VBM) approach, which may provide an effective data block deduplication means by only scanning a file management system without accessing file nodes and indirect blocks.

Generally, after a duplicate data is discovered by deduplication scanning, a pointer of a VBM module of the discovered duplicate data is usually re-pointed to a VBM module of an existing data, and a storage space of the duplicate data is reclaimed so that it becomes a free storage space.

However, redirecting of the pointer of the VBM module of the duplicate data will cause read redirect and write split, which further causes performance degradation. Write split is caused mainly due to introduction of fragments, since in most cases, the deduplication operation will break the originally continuous data storage area into a plurality of pieces; therefore, introduction of fragments is an inherent disadvantage of such deduplication operation. At present, performance issues incurred by deduplication have potentially caused some barriers to use the technology.

SUMMARY

In view of the above, the present disclosure provides a new technical solution for data deduplication so as to overcome or mitigate at least part of the deficiencies existing in the prior art indicated above.

According to a first aspect of the present disclosure, there is provided a method for data deduplication. The method may comprise: setting, for a to-be-deduplicated data block, a pointer pointed to the to-be-deduplicated data block as a pointer pointed to a corresponding to-be-reserved data block, and setting a virtual pointer pointed to the to-be-deduplicated data block; cancelling, in response to an available storage capacity reaching a predetermined value, virtual pointers of respective to-be-deduplicated data blocks to be reclaimed, and reclaiming storage spaces of the respective to-be-deduplicated data blocks to be reclaimed. In particular, when the virtual pointer pointed to the to-be-deduplicated data block is available, the to-be-deduplicated data block is accessed through the virtual pointer.

In an embodiment according to the present disclosure, the method may further comprise: storing the virtual pointer pointed to the to-be-deduplicated data block by adopting, in a dual-pointer structure, a structure similar to that of the pointer set as the pointer pointed to the corresponding to-be-reserved data block.

In another embodiment according to the present disclosure, the method may further comprise: setting, for the virtual pointer pointed to the to-be-deduplicated data block, a virtual point indication bit that indicates whether the virtual pointer is available.

In a further embodiment according to the present disclosure, the cancelling virtual pointers of respective to-be-deduplicated data blocks to be reclaimed may comprise: setting the virtual pointer indication bit as a value indicating that the virtual machine is unavailable.

In still further embodiment according to the present disclosure, the method may further comprise: setting, for a pointer pointed to a respective data block, a sharing count bit indicating the number of other data blocks sharing the pointer, wherein if a value of the sharing count bit is greater than 0 and the virtual pointer is unavailable, a new storage resource is allocated for a write operation on a data block, when the write operation is performed, and the pointer of the data block on which the write operation is performed is set to be pointed to the data block stored with the newly allocated storage resource.

In another embodiment according to the present disclosure, when allocating the new storage resource to the write operation, one of the following operations is performed if there is no available free storage resource: reclaiming continuous data blocks with a relatively long length among reclaimable resources, so as to be allocated to the write operation; and reclaiming continuous data blocks with a length better matching the write operation among the reclaimable resources, so as to be allocated to the write operation.

In a further embodiment of the present disclosure, the method may further comprise: determining all reclaimable to-be-deduplicated data blocks, and determining a part of all reclaimable to-be-deduplicated data blocks as the to-be-deduplicated data blocks to be reclaimed.

In a further embodiment of the present disclosure, the part of all to-be-deduplicated data blocks includes continuous data blocks in all of the to-be-deduplicated data blocks.

According to a second aspect of the present disclosure, there is provided an apparatus for data deduplication. The apparatus may comprise: a pointer setting module and a space reclaiming module. The pointer setting module may be configured to: set, for a to-be-deduplicated data block, a pointer pointed to the to-be-deduplicated data block as a pointer pointed to a corresponding to-be-reserved data block, and set a virtual pointer pointed to the to-be-deduplicated data block. The space reclaiming module may be configured to: cancel, in response to an available storage capacity reaching a predetermined value, virtual pointers of respective to-be-deduplicated data blocks to be reclaimed, and reclaim storage spaces of the respective to-be-deduplicated data blocks to be reclaimed. In particular, when the virtual pointer pointed to the to-be-deduplicated data block is available, the to-be-deduplicated data block is directly accessed through the virtual pointer.

According to a third aspect of the present disclosure, there is provided a system for data deduplication. The system comprises: a VBM address parser, a space monitor, and a VBM scanner. The VBM address parser is configured to obtain an address of a to-be-accessed data block from respective VBM modules. The space monitor is configured to monitor an available storage space. The VBM scanner may be configured to scan the respective VBM modules; set, for a to-be-deduplicated data block, a pointer of a corresponding VBM module as a pointer pointed to the VBM module of a corresponding to-be-reserved data block; set, for the corresponding VBM, a virtual pointer pointed to the to-be-deduplicated data block; cancel, in response to determining that an available storage space monitored by the space monitor reaches a predetermined value, virtual pointers pointed to respective to-be-reclaimed to-be-deduplicated data blocks; and reclaim storage spaces of the respective to-be-deduplicated data block to be reclaimed. The VBM address parser may be further configured to: when the virtual pointer pointed to the to-be-accessed data block is available, take the address to which the virtual pointer is pointed as the address for the data block.

According to a fourth aspect of the present disclosure, there is also provided a computer program product with program codes provided thereon, which, when being executed on a processor, cause the processor to perform the method according to a first aspect of the present disclosure.

In an embodiment of the present disclosure, there is provided an improved technical solution for data deduplication. According to the technical solution, for a to-be-deduplicated data block, when the pointer pointed thereto is redirected, a corresponding virtual pointer pointed to the to-be-deduplicated data may be further set thereto, and meanwhile, the space occupied by the to-be-deduplicated data block will not be reclaimed until the available storage capacity becomes insufficient. In this way, before the available storage capacity becomes insufficient, the virtual pointer of this data block is usable, and at this point, the data block may be directly accessed through the virtual pointer. Therefore, the performance of data access may be significantly enhanced.

BRIEF DESCRIPTION OF THE DRAWINGS

The above and other objectives, features, and advantages of example embodiments of the present disclosure will become more apparent through the following detailed description with reference to the accompanying drawings. In the drawings.

DETAILED DESCRIPTION OF EMBODIMENTS

Hereinafter, various exemplary embodiments of the present disclosure will be described in detail with reference to the accompanying drawings. It should be noted that these drawings and depictions merely involve exemplary preferred embodiments. It should be noted that alternative embodiments of the structure and method disclosed here are easily envisaged according to subsequent depictions, and these alternative embodiments may be used without departing from the principle of the disclosure sought for protection by the present disclosure.

It should be understood that these exemplary embodiments are given only to enable those skilled in the art to better understand and then implement the present disclosure, not to limit the scope of the present disclosure in any manner. Besides, in the accompanying drawings, optional steps, modules, units and the like are illustrated in dashed boxes only for illustrative purposes.

As used herein, the terms "comprise(s)/comprising," "include(s)/including" and other similar terms are to be read as open-ended terms that mean "include, but is not limited to." The term "based on" is to be read as "based at least in part on." The term "one example embodiment" and "an example embodiment" are to be read as "at least one example embodiment." Relevant definitions of other terms will be given in the depictions infra.

Figure 1:
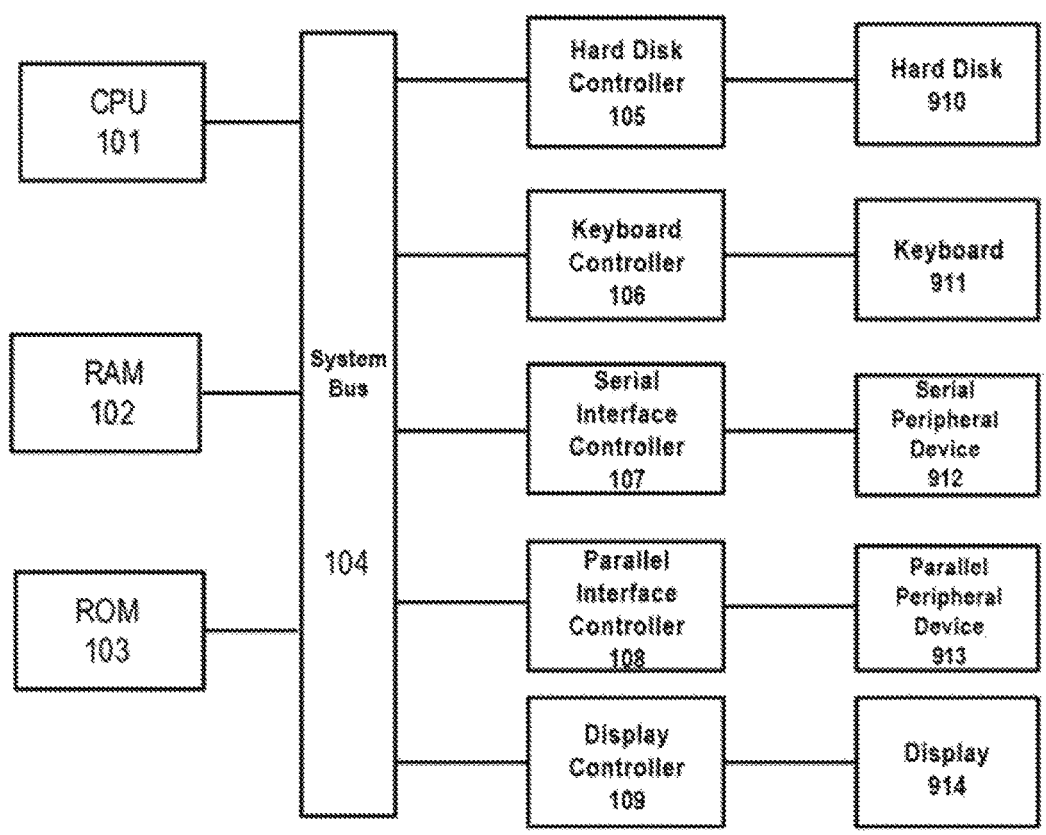
FIG. 1 schematically illustrates a structural block diagram of a computer device in which embodiments of the present disclosure may be implemented.

Prior to describing the technical solution of caching data according to the present disclosure, reference will be first made to FIG. 1 to describe a computer device in which the embodiments of the present disclosure may be implemented. FIG. 1 schematically illustrates a structural block diagram of a computer device in which the embodiments of the present disclosure will be implemented therein.

The computer system illustrated in FIG. 1 comprises a CPU (central processing unit) 101, a RAM (random access memory) 102, a ROM (read-only memory) 103, a system bus 104, a hard-disk controller 105, a keyboard controller 106, a serial interface controller 107, a parallel interface controller 108, a display controller 109, a hard disk 110, a keyboard 111, a serial peripheral device 112, a parallel peripheral device 113, and a display 114. Among these components, the CPU 101, RAM 102, ROM 103, hard-disk controller 105, keyboard controller 106, serial interface controller 107, parallel interface controller 108, and display controller 109 are connected to the system bus 104. The hard disk 110 is connected to the hard disk controller 105; the keyboard 111 is connected to the keyboard controller 106;

the serial external device 112 is connected to the serial interface controller 107; the parallel external device 113 is connected to the parallel interface controller 108; and the display 114 is connected to the display controller 109.

It should be noted that the structural block diagram of FIG. 1 is illustrated for illustrative purposes, not for limiting the present disclosure. In some cases, some devices may be added or reduced thereto or therefrom as needed. In addition, embodiments of the present disclosure are pointed to a solution for deduplicating data stored in the storage device such as hard disk 110, which can be stored as computer program codes in the storage device of the computer. The computer program codes, when being loaded into, for example, a memory to be executed, will cause the CPU 101 to execute the technical solution for data deduplication according to the present disclosure.

Figure 2:
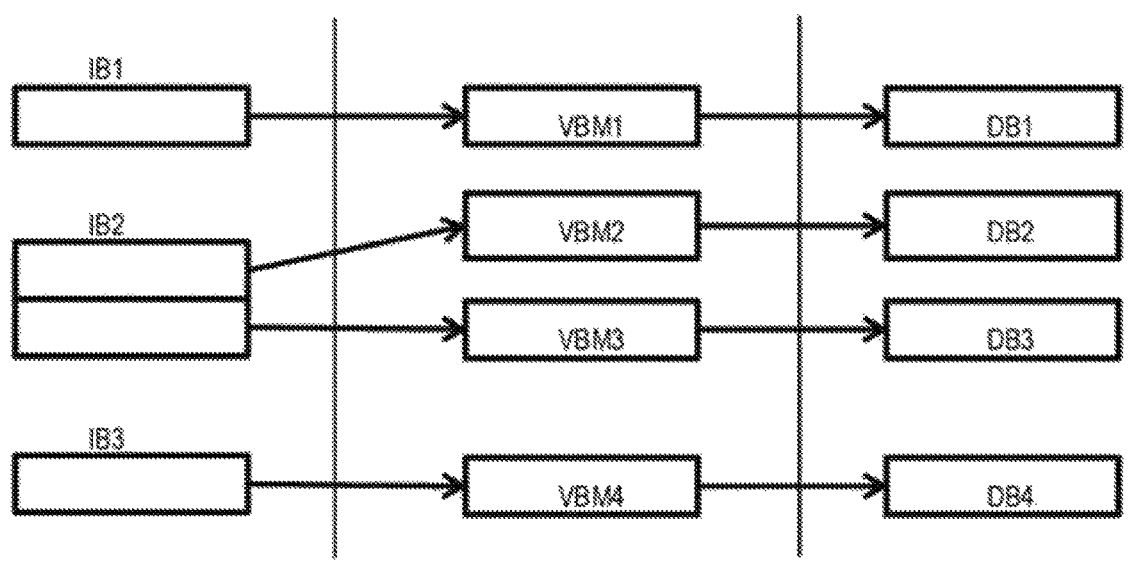
FIG. 2 schematically illustrates a diagram of a relationship between VBM modules with leaf indirect blocks and physical data blocks before deduplication in a traditional deduplication scheme.
Figure 3:
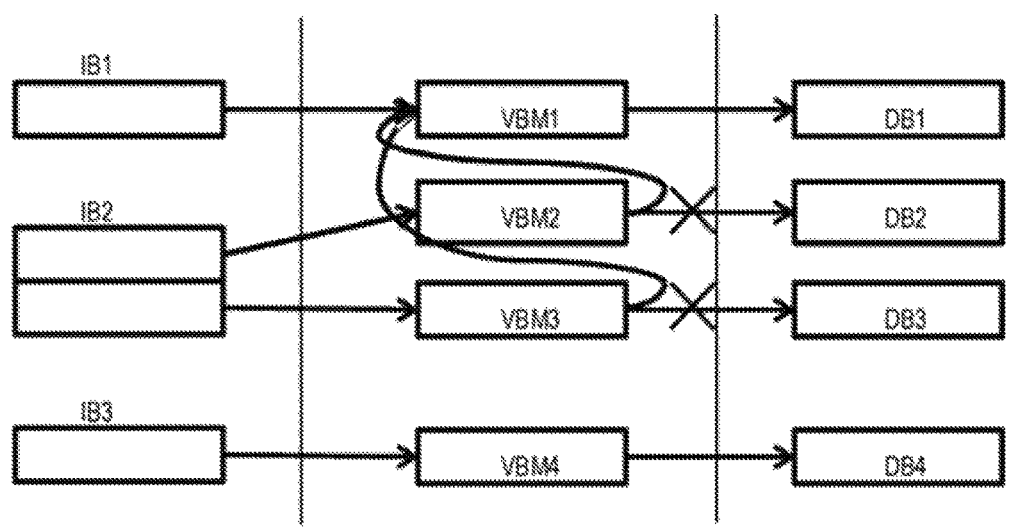
FIG. 3 schematically illustrates a diagram of a relationship between VBM modules with leaf indirect blocks and physical data blocks after deduplication in a traditional deduplication scheme.

In order to make those skilled in the art better understand the spirit of the solution provided in the embodiments of the present disclosure, a traditional deduplication solution will be first described briefly with reference to FIGS. 2 and 3.

FIG. 2 schematically illustrates a diagram a relationship between VBM modules with leaf indirect blocks and physical data blocks before deduplication in a traditional deduplication scheme. Herein, "indirect blocks" refer to index blocks or address index blocks, which means address pointers pointed to data blocks. The IB1 to IB3 indirect blocks as illustrated in FIG. 2 are indirect blocks at the last layer between physical data blocks, referred to as leaf indirect blocks. An indirect block may be pointed to one or more data blocks. DB1-DB4 are physical data blocks located on a physical storage device. In order to perform the deduplication operation, VBM modules (briefly referred to as "VBMs" hereinafter, for the ease of depiction) are provided between the leaf indirect blocks IB1-IB3 and physical data blocks DB1-DB4; the VBM modules are virtual data management modules provided for managing the physical data. A VBM module can only be pointed to one physical data block; while a plurality of corresponding VBM modules can be provided for indirect blocks that are pointed to a plurality of physical data blocks and the indirect blocks are pointed to the corresponding physical data blocks through the plurality of VBM modules, respectively. Deduplication may be performed to each data block by virtue of the VBMs.

FIG. 3 schematically illustrates a diagram of a relationship between VBM modules with leaf indirect blocks and physical data blocks after deduplication in a traditional deduplication scheme. As illustrated in FIG. 3, after the deduplication scanning, it is determined that DB2 and DB3 are duplicate data blocks of DB1, and thus they need to be deduplicated. For the to-be-deduplicated data blocks DB2 and DB3, pointers of VBM2 and VBM3 pointed thereto are set to be pointed to the VBM1 corresponding to the to-be-reserved data block DB1, i.e., redirecting their pointers to the VBM1 of the data block DB1, and reclaiming the space occupied by DB2 and DB3, such that they become free storage spaces.

In this way, according to the traditional deduplication solution, when accessing the data DB2 and DB3, it will be first redirected to VBM1 via pointers of VBM2 and VBM3, and then DB1 identical to them is accessed via the pointer of VBM1 since DB2 and DB3 are deduplicated due to being identical to DB1. In this way, redirecting of the pointers of VBM2 and VBM3 will cause redirection of the read operation, and also cause write split of the write operation, which in turn further causes performance degradation. The deduplication operation breaks the originally continuous data zone into a plurality of pieces, introducing unwanted fragments, which is a main cause of write split. Therefore, the continuous read/write that originally had a good performance becomes a random read/write with a worse performance.

To this end, the present disclosure provides a solution for data deduplication so as to at least partially overcome the problems existing in the prior art. According to embodiments of the present disclosure, for to-be-deduplicated data blocks, pointers pointed to these to-be-deduplicated data blocks are set to pointers pointed to corresponding to-be-reserved data blocks, and virtual pointers pointed to the to-be-deduplicated data blocks are set. In addition, in response to an available storage capacity reaching a predetermined value, virtual pointers pointed to respective to-be-deduplicated data blocks to be reclaimed are cancelled, and storage spaces of the respective to-be-deduplicated data blocks to be reclaimed are reclaimed. Meanwhile, when the virtual pointers pointed to the to-be-deduplicated data blocks are available, the to-be-deduplicated data blocks are directly accessed through the virtual pointers. Therefore, according to the technical solution, for the to-be-deduplicated data blocks, while redirecting the pointers pointed thereto, a corresponding virtual pointer pointed to the to-be-deduplicated data can be set, and further before the available storage capacity becomes insufficient, the space occupied by the to-be-deduplicated data block will not be reclaimed. In this way, before the available storage capacity becomes insufficient, the virtual pointer for the data block will be still available; in this case, the data block may be directly accessed via the virtual pointer. Consequently, the performance of data access may be significantly enhanced.

Hereinafter, FIG. 4 will be referenced to describe a flow diagram of a method for data deduplication according to an embodiment of the present disclosure.

Figure 4:
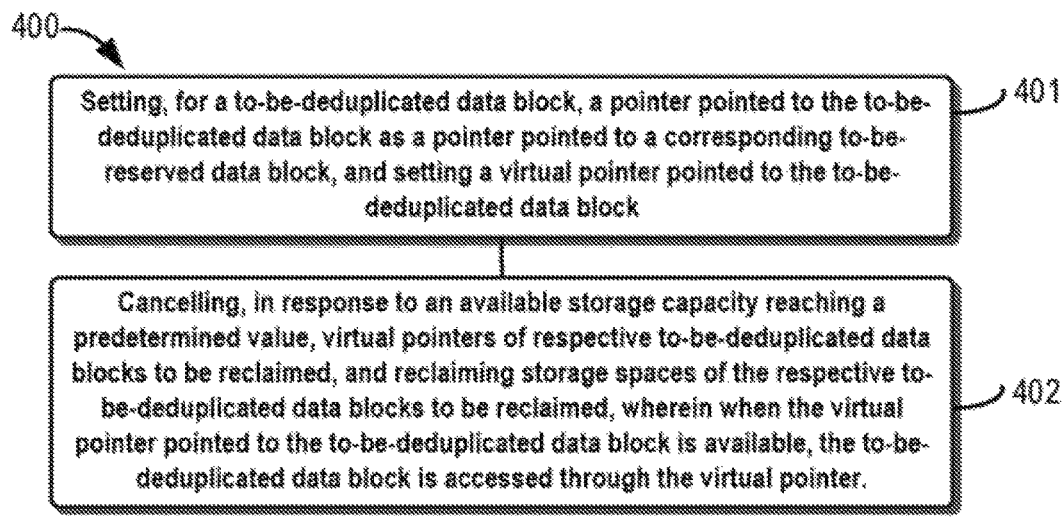
FIG. 4 schematically illustrates a flow diagram of a method for data deduplication according to an embodiment of the present disclosure.

As illustrated in FIG. 4, first in step 401, for a to-be-deduplicated data block, a pointer pointed to the to-be-deduplicated data block is set to a pointer pointed to a corresponding to-be-reserved data block, and a virtual pointer pointed to the to-be-deduplicated data block is set.

In an embodiment of the present disclosure, the deduplication scanning may also be referred to as resource reclaim scanning, which is a process of scanning VBM modules when deduplication is required so as to determine reclaimable data blocks. This process may be executed periodically at a predetermined frequency or time interval, or may be compulsorily executed when the available space reaches a predetermined threshold or the space is insufficient for completing an on-going operation. The predetermined threshold may be much smaller than the threshold used when reclaiming the storage space. After duplicate data are found by performing the deduplication scanning, for the to-be-deduplicated data block, the pointers of their VBM modules pointed thereto may be redirected to the pointers of the VBM block of the to-be-reserved data block; and meanwhile, for the to-be-deduplicated data block, a virtual pointer pointed thereto may also be set. Besides, it is required to be noted that for the to-be-deduplicated data block, the pointer of VBM module pointed thereto may be reserved, and meanwhile for the VBM, a pointer pointed to the VBM module of the to-be-reserved data block may be newly added. In this way, the aforementioned operation of setting a pointer pointed to the to-be-deduplicated data block to a pointer pointed to a corresponding to-be-reserved data block, and setting a virtual pointer pointed to the to-be-deduplicated data block can be implemented likewise.

It can be seen from the description above that in an embodiment according to the present disclosure, there exist two pointers for the to-be-deduplicated data block. One pointer is pointed to a pointer associated with the corresponding to-be-reserved data block, and thus the pointer is indirectly pointed to the data block identical to the to-be-deduplicated data; the other pointer is a virtual pointer, directly pointed to the to-be-deduplicated data block. The "virtual" for the virtual pointer does not mean that the pointer is fictional or non-existent, but means a pointer that would have been non-existent due to the deduplication of the data, but is specially set according to the present disclosure. Therefore, setting of the virtual pointer indicates a special status in which the relevant data block is currently located. In other words, the data block to be pointed by the virtual pointer is a data block which will be deduplicated but whose resource has not been reclaimed yet.

Figure 5:
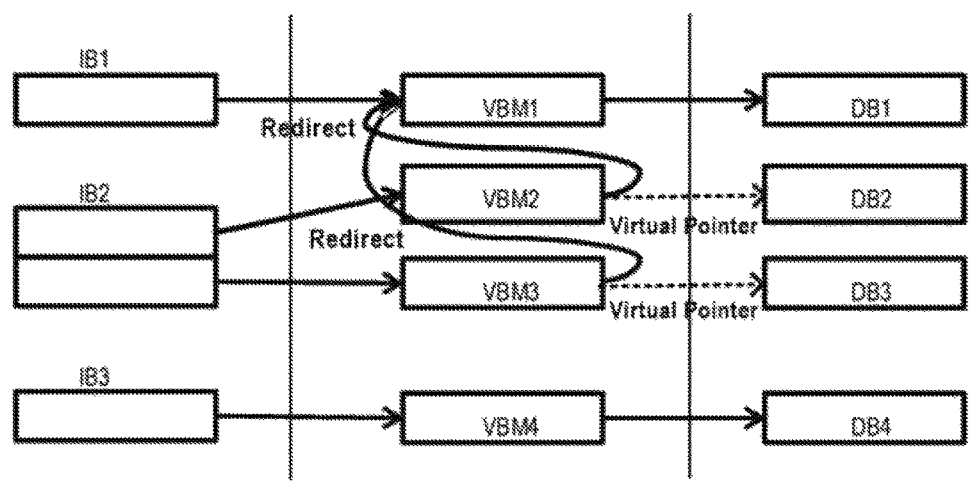
FIG. 5 schematically illustrates a flow diagram of a relationship between virtual management modules with leaf indirect blocks and physical data blocks according to an embodiment of the present disclosure.

For illustration purposes, FIG. 5 illustrates a diagram of a relationship between virtual management modules and leaf indirect blocks with physical data blocks according to an embodiment of the present disclosure. As illustrated in FIG. 5, for the to-be-deduplicated data blocks DB2 and DB3, the pointer of VBM2 and VBM3 corresponding thereto are redirected to the VBM1 corresponding to the to-be-reserved data block DB1, and meanwhile virtual pointers pointed to DB2 and DB3 are set for the VBM2 and VBM3. Therefore, it can be seen from FIG. 5 that for each of the VBM2 and VBM3 associated with the to-be-deduplicated data blocks, there exists a dual-pointer structure: one is a pointer pointed to the VBM of the to-be-reserved data block; the other one is a virtual pointer directly pointed to the to-be-deduplicated data block.

The pointer structures above may be stored in any appropriate structure. In one embodiment according to the present disclosure, a dual-pointer structure may be used to store the two pointers of the VBM. Moreover, the two pointers may be stored using a similar structure. Moreover, the two pointers may be stored for example using a similar structure. For illustrative purposes, FIG. 6 shows an exemplary dual-pointer structure.

Figure 6:
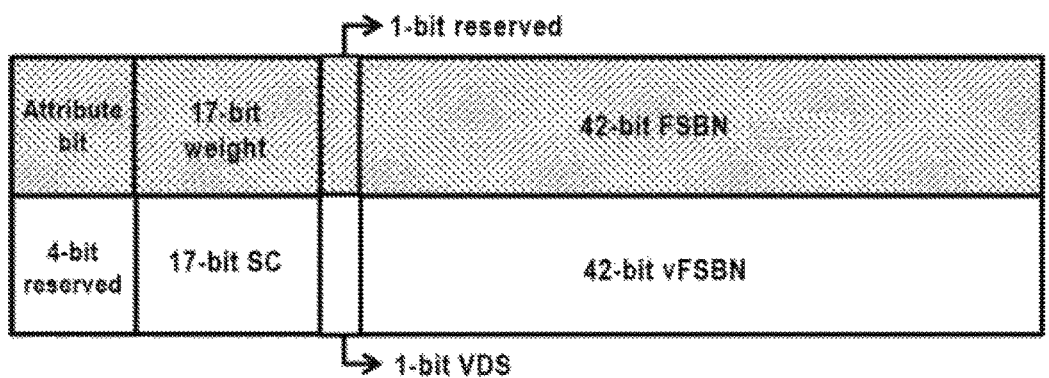
FIG. 6 schematically illustrates a diagram of an exemplary data structure for a VBM module according to an embodiment of the present disclosure.

With reference to FIG. 6, the exemplary structure illustrated in the figure has a 128-bit size, with the first 64 bits for storing the real pointer of the VBM, while the last 64 bits for storing virtual pointer of the VBM. In particular, the first 64 bits for example may have a structure similar to the pointer of a traditional VBM so as to consider the compatibility. Among the first 64 bits, the first four bits are attribute bits, indicating whether the mapping is a VBM mapping; the immediate following 17 bits are weight bits, indicating the priority of VBM update; the next 1 bit is reserved; the following 42 bits are a file system block number FSBN indicating a physical data block address, which might indicate the address of its original physical data block, and in a case that a data block is to be deduplicated or has been to deduplicated, which might also indicate a FSBN corresponding to the to-be-reserved data block. The last 64 bits are for storing the virtual pointer, with a structure substantially similar to the preceding 64 bits; however, the meanings of some bits are different. As illustrated in FIG. 6, among the last 64 bits, the first 4 bits are reserved bits; the immediately following 17 bits are sharing count bits, indicating the number of pointers of other VBMs sharing the pointer of the VBM, in other words, how many other VBMs have their pointers redirected to the VBM, and its value is set as 0 for a new VBM; the next 1 bit is a virtual data sharing bit VDS indicating whether the virtual pointer is available, with 1 indicating that the VBM has an available virtual pointer, and with 0 indicating that there is no virtual pointer, and the VDS is set to 0 for a new VBM; the last 42 bits are a virtual file system block number vFSBN indicating the address of the to-be-deduplicated data, which stores the FSBN of the to-be-deduplicated data block.

Next, reference is made back to FIG. 4, in step 402, in response to the available storage capacity reaching a predetermined value, virtual pointers pointed to respective to-be-deduplicated data blocks to be reclaimed are cancelled, and the storage space of the respective to-be-deduplicated data blocks to be reclaimed is reclaimed. Before the storage space of the to-be-deduplicated data blocks is actually reclaimed, the virtual pointers pointed to the to-be-deduplicated data blocks are available. In this case, the to-be-deduplicated data blocks may be accessed through the virtual pointers.

Therefore, in embodiments according to the present disclosure, different from the traditional deduplication solution, the present disclosure adopts an approach of delaying reclaiming of resources, i.e., the reclaimable resources are only reclaimed when needed. Therefore, in this deduplication manner, by means of the virtual pointers, a better data access performance may be provided while guaranteeing a sufficient available storage space.

In an embodiment according to the present disclosure, cancelling the virtual pointers pointed to respective to-be-deduplicated data blocks may be implemented by setting the virtual pointer indication bit (e.g., the VDS in the structure illustrated in FIG. 6) to a value indicating that the virtual pointer is unavailable (e.g., 0 or other value indicating the unavailability). In addition, in fact, cancellation of the virtual pointers may also be implemented by directly deleting all virtual pointer information stored in the corresponding data structure or only deleting the vFSBN.

In addition, when reclaiming the storage space of the respective to-be-deduplicated data blocks to be reclaimed, an optimization operation may be further executed. In an embodiment according to the present disclosure, before reclaiming the storage space, it may first search all reclaimable to-be-deduplicated data blocks. Then, a part of data blocks among all of these reclaimable to-be-deduplicated data blocks may be determined as to-be-reclaimed data blocks. This part of data block are those capable of satisfying requirements of available storage space; in other words, it is not required to reclaim all reclaimable storage space, so as to maintain the virtual pointers available as much as possible. Meanwhile, data blocks that can reduce risks of generating fragmentations may be further determined therefrom as to-be-reclaimed data blocks. In particular, all continuous data blocks in the to-be-deduplicated data blocks can be determined as the part of data blocks of the reclaimed data blocks. In this way, reclaiming of the storage space is not a simple direct reclaiming; instead, it will consider the possibility of generation of fragments. The relatively continuous storage space is reclaimed with a higher priority, while the non-continuous space or the space, those with a relatively short continuous length such that it is easy to generate fragment, will not be reclaimed; and moreover the virtual pointers of the data blocks, which occupy a discontinuous space or have a relatively short continuous length, such that it is easy to generate fragment, are maintained to available as much as possible. These data will not be reclaimed until they form a continuous relatively large block storage area with other to-be-reclaimed data blocks. Therefore, on one hand, the access efficiency of the data block may be ensured, and meanwhile, generation of fragmentation may be reduced as much as possible.

Besides, if no virtual pointer of a VBM is found unavailable during performing the write operation and the VBM also shares a pointer with other VBM, this means the write operation is a write operation on the deduplicated data blocks. At this point, a new storage space will be allocated to the write operation. The original data block will be copied and stored in the newly allocated storage space, so that the deduplicated data block can be rewritten. In this case, it is also needed to decrease the SC value of the VBM by 1, and meanwhile to redirect the pointer of the VBM as a true access target to the new data block stored in the newly allocated resource, and set the virtual pointer as invalid. If it is found that there is already no enough free space when allocating the resources to the write operation, the resource reallocation operation may be performed, i.e., reclaim scanning the available resources to perform resource reclaiming. Preferably, the continuous data blocks with a relatively long length in the available resources are allocated to the write operation, so as to guarantee efficient sequential read/write as much as possible. Alternatively, the continuous data blocks with a length better matching the write operation among the available resources may be allocated to the write operation. This may better exploit the resources, but also increases the processing overheads for resource allocation. In addition, it should be noted that the resource re-allocation operation per se is to solve the bursting problem of insufficient storage space, which may be a simplified resource reclaiming operation only solving the current emergent demand of insufficient space. In addition, alternatively, an operation similar to resource reclaiming in step 402 may also be considered.

In order to illustrate the data deduplication solution provided in the present disclosure more thoroughly, various relevant operations under the data deduplication solution in the embodiment of the present disclosure will be described with reference to FIGS. 7-11.

Figure 7:
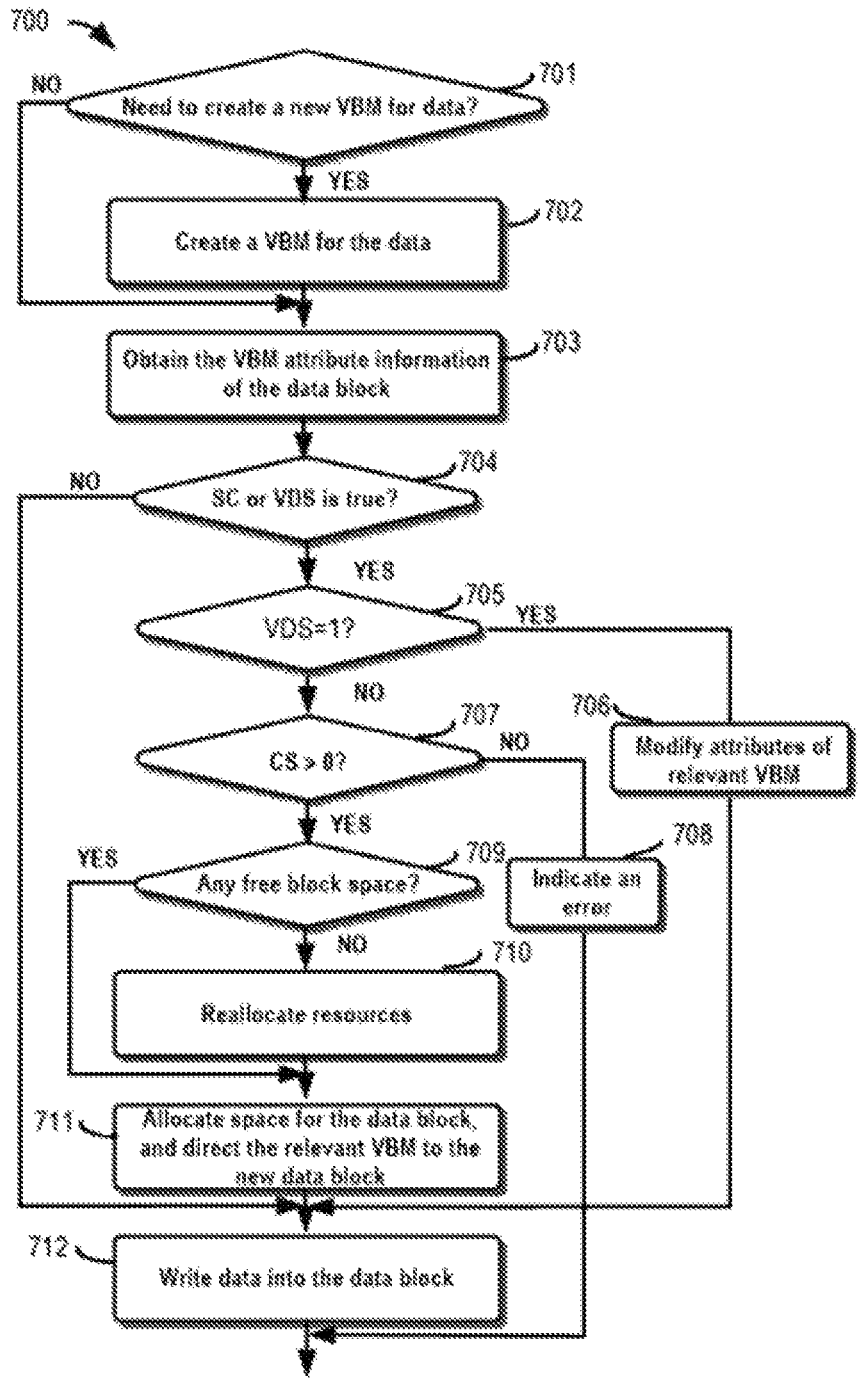
FIG. 7 schematically illustrates a flow diagram of a process for performing a write operation according to an embodiment of the present disclosure.

First, reference is made to FIG. 7, in which a flow diagram of a process for performing a write operation according to an embodiment of the present disclosure is schematically presented. The process 700 starts from step 701, in which it is determined whether it is required to create a new VBM, i.e., this write operation is a new data write operation or an rewriting operation on existing data. For example, the step 701 may be performed by checking a target address of to-be-written data. If the target address of the to-be-written data is a new address, it is needed to create a new VBM; then, a corresponding VBM may be created and initialized in step 702; then the process 700 proceeds from step 702 to step 703. If the target address of the to-be-written data is the address of existing data, there is no need to create a new VBM, and thus the process 700 may directly jump to step 703. In step 703, the VBM of the accessed data block will be scanned to obtain attribute information of the VBM. Next, in step 704, it is determined whether the SC or VDS is true, i.e., whether one of the two is not zero.

If it is determined in step 704 that they are both 0, i.e., SC=0 and VDS=0, this means no pointer of any VBM is redirected to that VBM, and the VBM has no virtual pointer, in this case, the process 700 directly jumps to step 712 to write the data into the data block of the target address. On the contrary, if at least one of the SC and VDS is determined as being not zero in step 704, it is further determined in step 705 whether the VDS is equal to 1, i.e., whether a virtual pointer exists. If VDS=1, a virtual pointer exists. This means the write operation is aiming at a data block that will be deduplicated but has not been reclaimed yet. At this point, the writing operation may be directly performed on the data block; however, relevant VBM attributes need to be modified in step 706. For illustration purposes, FIG. 8 will be referenced to describe modifying the VBM attribute of write operation.

Figure 8:
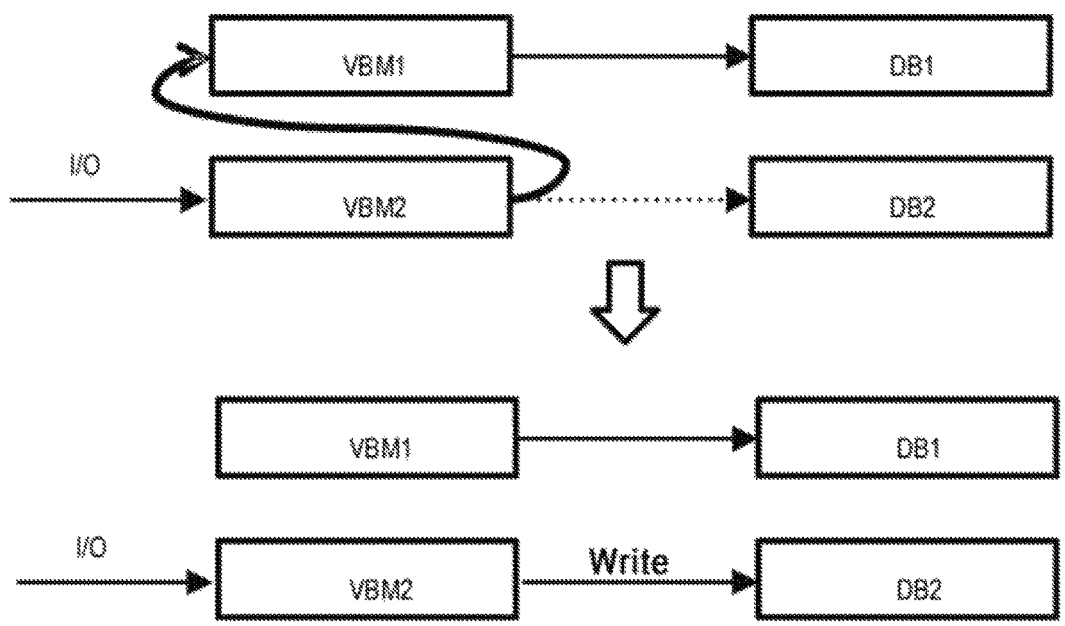
FIG. 8 schematically illustrates a diagram of a VBM attribute modification during a write operation according to an embodiment of the present disclosure.

As illustrated in FIG. 8, in a case that the write I/O operation is aiming at VBM2, when the VDS of VBM=1, it means that although the corresponding data block DB2 has been labelled as duplicate data, its storage space has not been reclaimed yet, and the data block DB2 is actually still stored at its original position; therefore, operation can be performed directly on the DB2. At this point, the VBM module VBM2 of the deduplicated data DB2 may be modified. For example, the attribute of VBM1 may be first obtained via the FSBN of VBM2, and then the SC value of VBM1 is reduced by 1; next, the real pointer of VBM2 is set to the address to which the virtual pointer is pointed; or, the pointer of VBM2 is redirected to the data block DB2, which may be done by copying and duplicating the vFSBN of the VBM2 to the FSBN of the VBM2. Meanwhile, the VDS of VBM2 may also be set to 0 to cancel the virtual pointer. At this time, the relationship between the VBM module and the physical data block is illustrated in FIG. 8 below. After modification of relevant VBM attributes is completed, the method may jump to step 712 to write data to the data block to which the pointer of the target VBM is pointed.

On the other hand, when it is determined in step 705 that VDS=0, it will be determined in step 707 whether CS is greater than 0, i.e., whether there exist other VBMs to be pointed to the VBM. If it is determined in step 707 that SC=0 or other invalid value, it means an error exists, because it has been determined in step 704 that at least one of SC or VDS is true, while in step 707, both VDS and SC are zero. In this case, the error may be popped out in step 708 to indicate occurrence of the error and then it may exit the process. On the contrary, if it is determined in step 707 that CS is greater than 0, it means a write operation pointed to the deduplicated data. At this point, in step 709, it is determined whether a free block space exists; if no, an operation of resource reallocation is performed for the free block in step 710 (this operation will be depicted with reference to FIG. 9 and thus will not be detailed her). Then, the process 700 enters into step 711. If it is determined in step 709 that the free block space exists, the process 700 will skip 710 and directly enter step 711. In step 711, a space is allocated to the write operation, i.e., allocating a storage space to the data block to which the write operation is pointed, and directing the corresponding VBM to the new data block, i.e., redirecting it to the data block stored in the newly allocated space; then the process proceeds to step 712. In this step, the data is written into the new data block.

Upon arrival of a new write I/O request, if the data storage space has been unexpectedly fully filled such that there is no free data block space, some reclaimable data blocks need to be found at this time to release resources so as to be capable of continuing the operation, i.e., the scenario in step 710 in FIG. 7. Hereinafter, FIG. 9 will be referenced to describe a process for performing resource reallocation according to an embodiment of the present disclosure.

Figure 9:
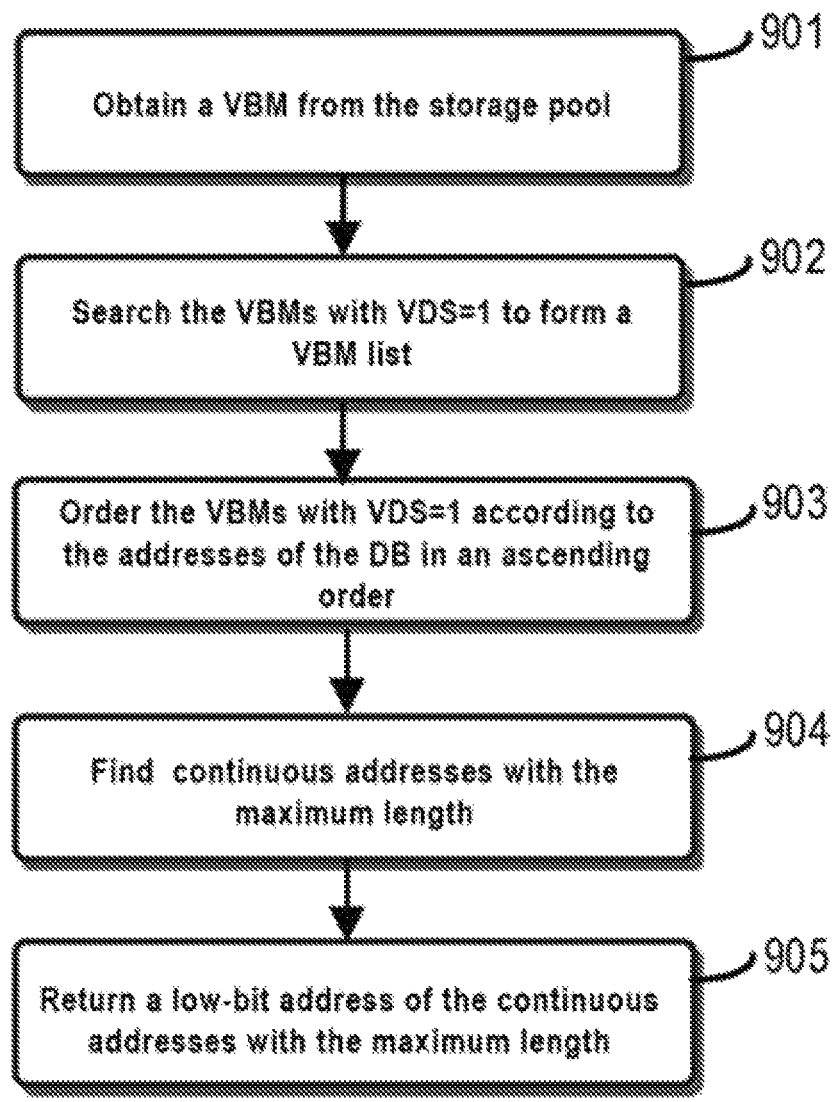
FIG. 9 schematically illustrates a flow diagram of a process for performing resource to re-allocation according to an embodiment of the present disclosure.

In the embodiment illustrated in FIG. 9, a basic consideration is that the reclaimable data blocks should be data blocks with VDS=1 (i.e., the virtual pointer is available); in addition, the addresses of these reclaimable data blocks as found are preferably continuous addresses. According to these requirements, more optimal data blocks may be found from the reclaimable data blocks so as to satisfy an unpredictable I/O request. Specifically, as illustrated in FIG. 9, first in step 901, at least part of VBMs are obtained from a storage pool; then, VBMs with VDS=1 are searched among these VBMs to form a VBM list. For example, an attribute of respective VBM may be obtained; if its attribute VDS=1, it will be placed into a VBM list; if VDS≠1, the VBM will be abandoned. After forming the VBM list, the VBMs in the VBM list may be ordered according to the addresses of the reclaimable data blocks in a descending order. Next, a continuous address with the longest length is found according to the ordering in step 904; and in step 905, the low-bit address of the continuous address with the longest length is returned, the low-bit address indicating an initial position of the reallocated resource for the data block. It shall to be noted that although the allocated address in FIG. 9 is depicted as a continuous address with the longest length, the present disclosure is not limited thereto, and a continuous data block with a length better matching the write operation may also be allocated. In addition, it shall to be noted that the operation of resource reallocation illustrated in FIG. 9 is to address the issue of bursting storage space insufficiency, which, therefore, may be a simplified resource reclaiming operation only solving the emergent need of current space insufficiency. In addition, alternatively, an operation similar to the deduplication scanning as mentioned above may also be considered. The deduplication scanning will be illustrated in detail with reference to FIG. 11, and thus will not be detailed here.

Figure 10:
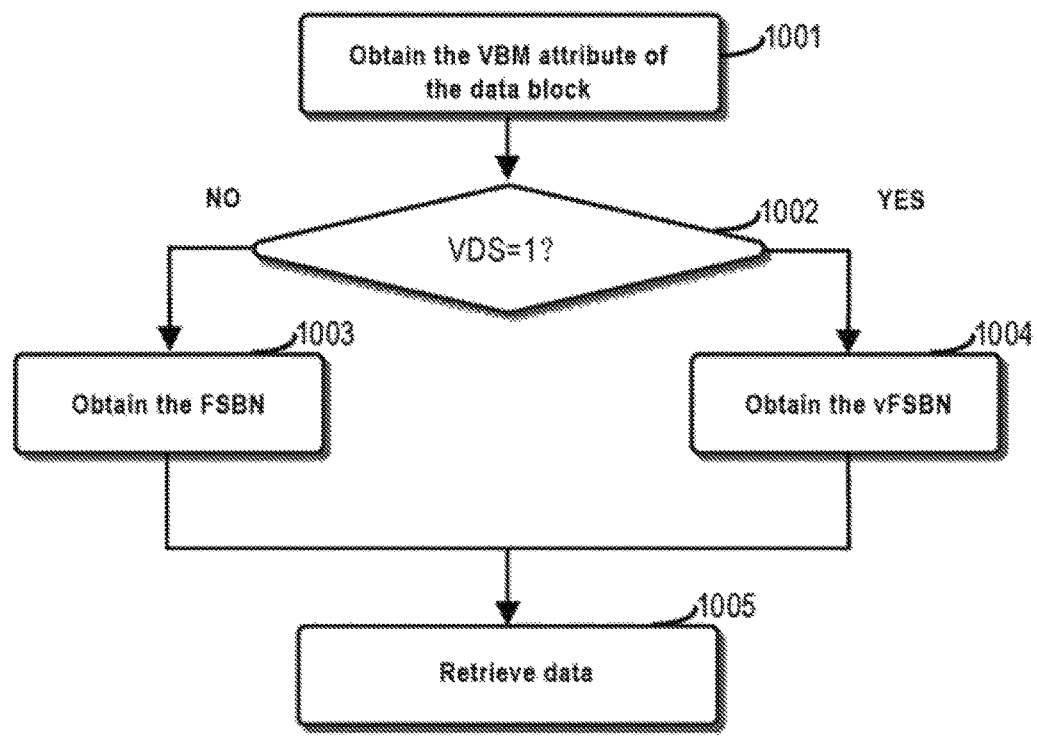
FIG. 10 schematically illustrates a flow diagram of a process for performing a read operation according to an embodiment of the present disclosure.

In addition, FIG. 10 also schematically shows a flow diagram of a process for performing a read operation according to an embodiment of the present disclosure. As illustrated in FIG. 10, first, the process starts from step 1001, in step 1001, a VBM attribute of a target data block is obtained. For example, when a read I/O request exists, the process will scan the VBM of the data block and obtain the attribute of the VBM. Then in step 1002, the process will check a VDS value in the attribute value of the VBM and determine whether it is 1 or whether any other value indicating that the virtual pointer is available. If VDS=0, it indicates that there is no available virtual pointer, which is possibly the case that the target data is not a duplicate data or the target data has been deduplicated. At this point, the process 1000 will obtain the FSBN of the VBM, then retrieve data from an address to which the pointer is pointed, or from an address to which the another pointer that the pointer is pointed to, and feed the retrieved data back to a read I/O request. If the VDS=1, it means a virtual pointer exists, i.e., the data block associated with the VBM is a data block that is to be deduplicated but whose space has not been reclaimed yet. At this point, the vFSBN of the VBM may be obtained, and a data value may be directly retrieved from the address to which the virtual pointer is pointed and be fed back to the read I/O request. According to the depiction above, it may be clearly seen that the read operation is much simpler than the process of the write operation, because the read operation does not involve operations such as resource allocation and VBM attribute modification, etc.

Figure 11:
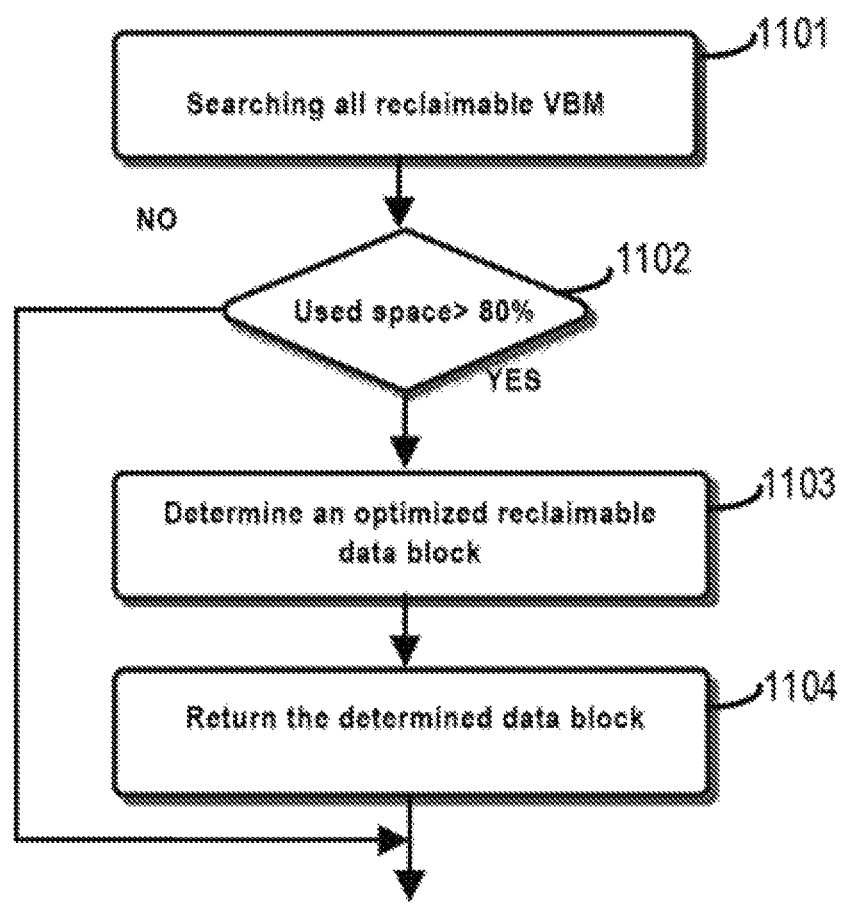
FIG. 11 schematically illustrates a flow diagram of a process for performing resource reclaim scanning according to an embodiment of the present disclosure.

FIG. 11 also schematically shows a flow diagram of a process for performing resource reclaim scanning according to an embodiment of the present disclosure. The resource reclaim scanning is also referred to a deduplication scanning, which is a process of scanning the VBM when it is needed to release the storage space, so as to look up the reclaimable data blocks. The process may be a periodical scanning process performed according to a certain frequency or at a time interval, or may be a process forcibly executed when the storage space reaches a predetermined lower threshold or the storage space cannot complete the ongoing operation. In particular, this process may also consider the space of the reclaimable data block and a fragmentation size.

As illustrated in FIG. 11, the process 1000 starts from the step 1101, in which all reclaimable VBMs (i.e., all to-be-deduplicated data blocks) are looked up, and VDSs of the VBMs of these data blocks equal to 1. Then, in step 1102, it is checked whether the system has enough available space, for example whether the used space is greater than 80% or other predetermined value. If the used space is smaller than the predetermined value, it indicates that there is enough available space; at this point, the spatial resource reclaiming operation will not be performed; therefore, this scanning process will directly end. If it is determined that the used space is higher than 80% in step 1102, i.e., the available storage space is lower than 20%, it is indicated that the available storage space is insufficient; at this point, the to-be-reclaimed data blocks may be determined in step 1103. The to-be-reclaimed data blocks may be a part of all reclaimable data blocks, as long as they can satisfy enough storage space; moreover, the optimized data blocks may be further returned. These optimized data blocks may be continuous data blocks among the to-be-deduplicated data blocks; furthermore, they may be continuous data blocks with a longer length. This may guarantee the I/O read performance of those to-be-deduplicated data blocks with a smaller length while avoiding generation of fragments. Finally, in step 1104, the determined reclaimed data blocks are returned so that their corresponding space resources are reclaimed.

To this end, in an embodiment of the present disclosure, there is provided an improved solution for data deduplication. According to the solution, for the to-be-deduplicated data block, while the pointer pointed thereto is redirected, a corresponding virtual pointer pointed to the to-be-deduplicated data may be further set therefor, and meanwhile the space occupied by the to-be-deduplicated data blocks will not be reclaimed until the available storage capacity is insufficient. In this way, before the available storage capacity becomes insufficient, the virtual pointer of the data block is available; at this point, the data block may be directly accessed using the virtual pointer. Therefore, the performance of data access may be enhanced significantly. In addition, when performing resource reclaiming, an optimized manner may be adopted to reduce the possibility of fragment generation, while reallocation of the resource may also consider the characteristics of the storage space and in turn guarantee sequential reading of data, which further enhance the data access performance.

Figure 12:
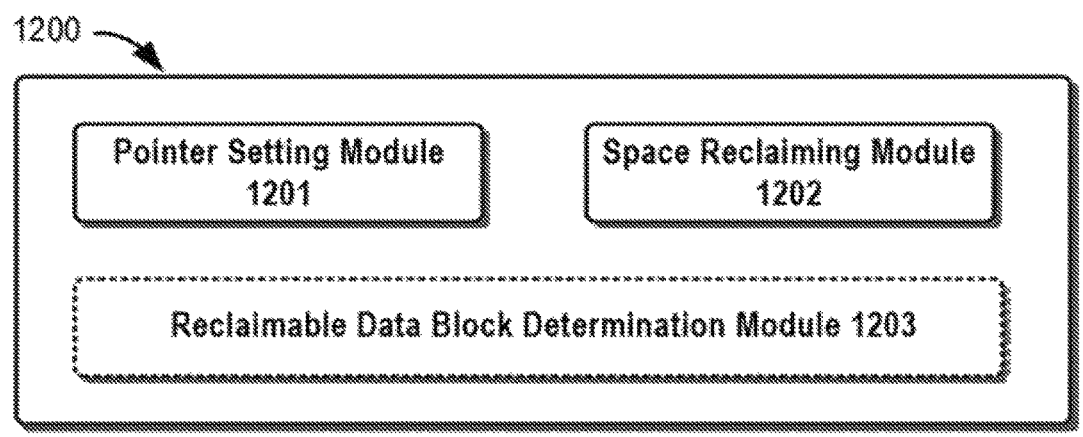
FIG. 12 schematically illustrates a block diagram of an apparatus for data deduplication according to an embodiment of the present disclosure.

FIG. 12 schematically shows a block diagram of an apparatus for data deduplication according to an embodiment of the present disclosure. As illustrated in FIG. 12, the apparatus 1200 may comprise a pointer setting module 1201 and a space reclaiming module 1202. The pointer setting module 1201 may be configured to: set, for a to-be-deduplicated data block, a pointer pointed to the to-be-deduplicated data block as a pointer pointed to a corresponding to-be-reserved data block, and set a virtual pointer pointed to the to-be-deduplicated data block. The space reclaiming module 1202 may be configured to: in response to an available storage capacity reaching a predetermined value, cancel virtual pointers of respective to-be-deduplicated data blocks to be reclaimed, and reclaim storage spaces of the respective to-be-deduplicated data blocks to be reclaimed. When the virtual pointer pointed to the to-be-deduplicated data block is available, the to-be-deduplicated data block is directly accessed through the virtual pointer.

In an embodiment according to the present disclosure, the pointer setting module 1201 may be further configured to store, in a dual-pointer structure, the virtual pointer pointed to the to-be-deduplicated data block, by adopting a structure similar to the pointer set to be the pointer pointed to the corresponding to-be-reserved data block.

In another embodiment of the present disclosure, the pointer setting module 1202 may be further configured to set, for the virtual pointer pointed to the to-be-deduplicated data block, a virtual pointer indication bit indicating whether the virtual pointer is available.

In a further embodiment of the present disclosure, the pointer setting module 1202 may be further configured to cancel virtual pointers of respective to-be-deduplicated data blocks to be reclaimed, by setting the virtual pointer indication bit as a value indicating that the virtual pointer is unavailable.

In another embodiment of the present disclosure, the pointer setting module 1201 may be further configured to: set, for a pointer pointed to each data block, a sharing count bit for indicating the number of pointers of other data blocks sharing the pointer, and in the case of the value of the sharing count bit being greater than 0 and the virtual pointer being unavailable, allocate a new storage resource for the write operation when performing the write operation, and set the pointer of the corresponding data block to being pointed to the data block stored using the newly allocated storage resource.

In another embodiment of the present disclosure, when allocating a new storage resource for the write operation, if there is no free storage resource, continuous data blocks with a relatively long length in the reclaimable resources may be reclaimed so as to be allocated to the write operation. Or alternatively, continuous data blocks whose length better matches with the write operation among the reclaimable resources may be reclaimed so as to be allocated to the write operation.

In addition, as illustrated in the figure, the apparatus 1200 may further comprise a reclaimable data block determination module 1203. The reclaimable data block determination module 1203 may be configured to determine all reclaimable to-be-deduplicated data blocks, and determine a part of all reclaimable to-be-deduplicated data blocks as the to-be-deduplicated data blocks to be reclaimed. Preferably, the part of all to-be-deduplicated data blocks includes continuous data blocks among the all to-be-deduplicated data blocks.

Figure 13:
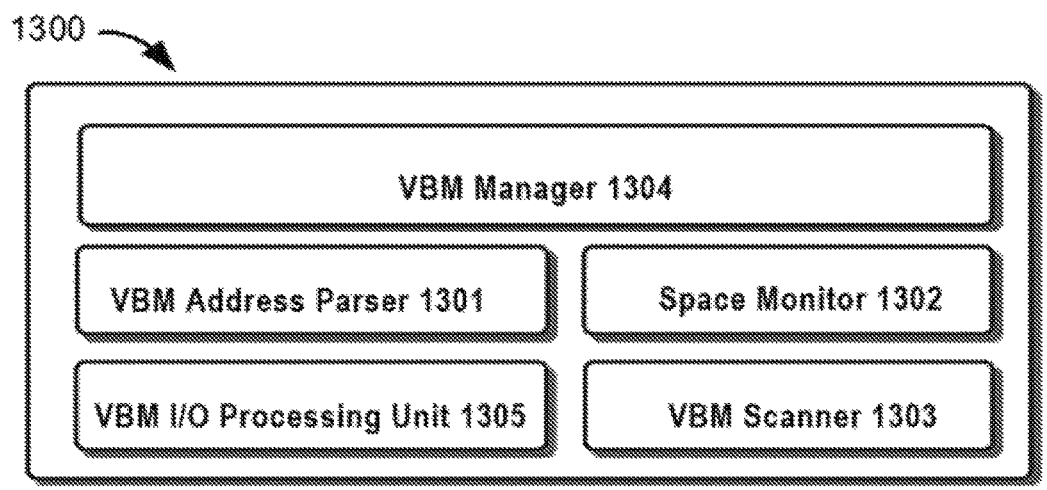
FIG. 13 schematically illustrates a block diagram of a system for data deduplication according to an embodiment of the present disclosure.

FIG. 13 also schematically illustrates a block diagram of a system for data deduplication according to an embodiment of the present disclosure. The system 1300 may also comprise a VBM address parser 1301, a space monitor 1302, and a VBM scanner 1303.

Different from existing VBM address parsers, the VBM address parser 1301 has an enhanced function. The VBM address parser 1301 may be configured to obtain the address of a to-be-accessed data block from respective VBM modules. The address is an actual address of the accessed data block. When an I/O request appears, the VBM address parser will read the corresponding VBM module and return a preferred manner capable of accessing the data. In other words, the VBM address parser 1301 may be further configured to use the address to which the virtual pointer is pointed as the address of the data block when the virtual pointer of the accessed data block is available, thereby enhancing the performance of data access.

The space monitor 1302 may be configured to monitor an available storage space. In the present disclosure, for the VBM module with a virtual pointer, those to-be-deduplicated data blocks may also be accessed through the virtual pointer. These data blocks per se may be deduplicated, but the time for resource reclaiming has not arrived yet; therefore, they still actually exist. Thus, resources of all of the to-be-deduplicated data blocks belong to reclaimable storage space, but do not belong to available storage space yet. Therefore, in an embodiment of the present disclosure, the space detector 1302 will not reckon the resources of these to-be-deduplicated data blocks into the available storage space.

The VBM scanner 1302 is responsible for scanning VBM modules, processing the duplicate data, and managing corresponding VBM modules. Specifically, the VBM scanner 1302 may be configured to scan respective VBM modules, and for the to-be-deduplicated data blocks, set the pointer of the corresponding VDM module to the pointer pointed to the VBM of the corresponding to-be-reserved data block, and set a virtual pointer pointed to the to-be-deduplicated data block. Moreover, the VBM scanner 1302 may also be configured to cancel, in response to determining that the available storage space monitored by the space monitor reaches a predetermined value, the virtual pointer pointed to respective to-be-deduplicated data blocks to be reclaimed, and reclaim the storage space of the respective to-be-deduplicated data blocks to be reclaimed.

In one embodiment of the present disclosure, the VBM scanner 1303 may be configured to store the virtual pointer pointed to the to-be-deduplicated data block in a dual-pointer structure, by adopting a structure set similar to the pointer of the corresponding to-be-reserved data block.

In another embodiment of the present disclosure, the VBM scanner 1303 may be to configured to: set, for the virtual pointer pointed to the to-be-deduplicated data block, a virtual pointer indication bit indicating whether the virtual pointer is available, and cancel the virtual pointers pointed to respective to-be-deduplicated data blocks to be reclaimed, by setting the virtual pointer indication bit to a value indicating that the virtual pointer is unavailable.

In a further embodiment of the present disclosure, the VBM scanner 1303 may be configured to: for a pointer pointed to each data block, set a sharing count bit for indicating the number of pointers of other data blocks sharing the pointer, allocate a new storage resource for the write operation when performing write operation on the data block if a value of the sharing count bit is greater than 0 and the virtual pointer is unavailable, and set the pointer of the data block for the write operation to a data block that is stored using the newly allocated storage resource.

In another embodiment of the present disclosure, when allocating a new storage resource for the write operation, if there is no available free storage resource, continuous data blocks with a longer length in the available resources may be reclaimed to be allocated to the write operation. Or alternatively, continuous data blocks with a length better matching the write operation among the available resources may be reclaimed so as to be allocated to the write operation.

In another embodiment of the present disclosure, the VBM scanner 1303 may be further configured to: determine all reclaimable to-be-deduplicated data blocks, and determine a part of all reclaimable to-be-deduplicated data blocks as the to-be-deduplicated data blocks the to-be-reclaimed, wherein the part of all of the to-be-deduplicated data blocks includes all of continuous data blocks in the to-be-deduplicated data blocks.

In another embodiment of the present disclosure, the system 1300 may further comprise a VBM manager 1304. The VBM manager 1304 is a module for managing the modules of the VBM, which is mainly for implementing an important interface for an external invoking module and providing an API to the external invoking module. Specifically, the VBM manager 1304 may be configured to provide an interface, e.g., an application programming interface API, for allocating data blocks to a file system, and allocate and reclaim resources for the VBM and data blocks. Its functions, for example, include, but not limited to, managing the VBMs, allocating the VBMs, and recycling the unused VBMs; providing APIs to the external file system so as to allocate data block resources; allocating the data block resources from a pool space, and recycle data block resources from the pool space.

In a still further embodiment of the present disclosure, the system 1300 may further comprise a VBM processing unit configured to modify or create a VBM for a data access operation and provide a packaged operation for the invoking program. In this way, the intermediate operation is transparent to the external invoking module, such that it appears like a direct access to the actual physical data block.

It shall to be noted that for purposes of simplification, operations of respective components of the apparatuses 1200 and 1300 have been described briefly. For details of the operations of these components, one can refer to relevant parts in the detailed depictions of the method in FIGS. 1 to 11.

Additionally, it also shall to be noted that the data deduplicating solution of the present disclosure may also be implemented through a computer program product. The computer program has program codes thereon, which, when being executed on the processor, cause the processor to perform the method of deduplicating textual data according to the present disclosure.

Additionally, it is further noted that although the present disclosure performs a detailed depiction of the present invention with reference to the deduplication solution using the VBM, it may be understood that a core idea of the present invention lies in delaying resource reclaiming and using virtual pointers; therefore, it is apparent that the present disclosure is not limited to the embodiments of using the VBMs; instead, it is also applicable to other deduplication solutions using the VBM, as long as they can be benefited.

In addition, it shall be noted that the embodiments of the present disclosure may be implemented in software and/or a combination of software and hardware. For example, they may be implemented by an application-specific integrated circuit (ASIC), a general-purpose computer or any other similar hardware device. In one embodiment, the software program of the present disclosure may also be executed by the processor to implement the steps or functions of the above. Likewise, the software program (including relevant data structure) of the present disclosure may be stored in a computer-readable recording medium, e.g., a RAM memory, a magnetic or optical driver or a soft disk or similar devices. Additionally, some steps or functions of the present disclosure may be implemented by hardware, e.g., a circuit cooperating with the processor to execute respective steps or functions.

In addition, a part of the present disclosure may be applied as a computer program product, e.g., a computer program instruction, which, when being executed by the computer, may invoke or provide the method and/or technical solution according to the present disclosure, while the program instruction invoking the method of the present disclosure, may be stored in an immobile or mobile recording medium, and/or transmitted through broadcast or other signal carrying media, and/or stored in a working memory of the computer device running according to the program instruction. Here, an embodiment according to the present disclosure comprises an apparatus that comprises a memory storing computer program instructions and a processor for executing program instructions, wherein when the computer program instructions are executed by the processor, the apparatus is triggered to execute the method and/or technical solution based on a plurality of embodiments of the present disclosure.

To those skilled in the art, it is apparent that the present disclosure is not limited to the above illustrative embodiments, and the present disclosure can be implemented in any other specific form without departing from the spirit or basic features of the present disclosure. Therefore, from any perspective, the embodiments should be regarded as illustrative, not limitative, and the scope of the present disclosure is limited by the appended claims, not by the depictions above; therefore, any changes intended to fall within the meaning and scope of equivalent elements of the claim should be included within the present disclosure. No reference signs in the claims should be regarded as limiting the involved claims. Besides, it is apparent that the word "comprise" does not exclude other units or steps, and the singularity does not exclude plurality. A plurality of units or modules stated in the apparatus claim may also be implemented by one unit or module through software or hardware. Words such as first and second are used to indicate names, without indicating any specific sequence.

Additionally, it can also be appreciated that from the disclosure and teaching here, those skilled in the art may envisage various modifications, transformations, substitutions or equivalents without departing from the spirit and scope of the present disclosure. These modifications, transformations, substitutions or equivalents are all included within the scope of the present disclosure limited by the claims.

We claim:

1. A method for data deduplication, comprising:
    setting, for a to-be-deduplicated data block, a pointer that previously pointed to the to-be-deduplicated data block to instead point to a corresponding to-be-reserved data block, the to-be-deduplicated data block and the to-be-reserved data block both containing identical data;
    setting a virtual pointer to point to the to-be-deduplicated data block while the pointer continues to point to the to-be-reserved data block;
    cancelling, in response to an available storage capacity reaching a predetermined value, virtual pointers of respective to-be-deduplicated data blocks to be reclaimed, and reclaiming storage spaces of the respective to-be-deduplicated data blocks to be reclaimed,
    wherein when the virtual pointer pointing to the to-be-deduplicated data block is available, the to-be-deduplicated data block is accessed through the virtual pointer.

2. The method according to claim 1, further comprising:
    storing the virtual pointer pointing to the to-be-deduplicated data block by adopting, in a dual-pointer structure, a structure similar to that of the pointer set as the pointer pointing to the corresponding to-be-reserved data block.

3. The method according to claim 1, further comprising:
    setting, for the virtual pointer pointing to the to-be-deduplicated data block, a virtual pointer indication bit that indicates whether the virtual pointer is available.

4. The method according to claim 3, wherein the cancelling virtual pointers of respective to-be-deduplicated data blocks to be reclaimed comprises: setting the virtual pointer indication bit as a value indicating that the virtual pointer is unavailable.

5. The method according to claim 1, further comprising:
setting, for a pointer pointing to a respective data block, a sharing count bit indicating the number of other data blocks sharing the pointer,
wherein if a value of the sharing count bit is greater than 0 and the virtual pointer is unavailable, a new storage resource is allocated for a write operation on a data block when the write operation is performed, and the pointer of the data block on which the write operation is performed is set to be pointed to the data block stored with the newly allocated storage resource.

6. The method according to claim 5, wherein when allocating the new storage resource to the write operation, one of the following operations is performed if there is no available free storage resource:
reclaiming continuous data blocks with a relatively long length among reclaimable resources, so as to be allocated to the write operation; and
reclaiming continuous data blocks with a length better matching the write operation among the reclaimable resources, so as to be allocated to the write operation.

7. The method according to claim 1, further comprising:
determining all reclaimable to-be-deduplicated data blocks, and
determining a part of all reclaimable to-be-deduplicated data blocks as the to-be-deduplicated data blocks to be reclaimed.

8. The method according to claim 7, wherein the part of all to-be-deduplicated data blocks includes continuous data blocks in all of the to-be-deduplicated data blocks.

9. The method according to claim 1 wherein:
setting the pointer that previously pointed to the to-be-deduplicated data block to instead point to the corresponding to-be-reserved data block includes setting, within a mapping module for a particular address, a first pointer that previously pointed to the to-be-deduplicated data block to instead point to the to-be-reserved data block; and
setting the virtual pointer to point to the to-be-deduplicated data block includes setting, within the mapping module for the particular address, a second pointer to point to the to-be-deduplicated data block while the first pointer continues to point to the to-be-reserved data block.

10. A computer program product comprising a non-transitory computer-readable medium storing instructions, which, when executed by a computer, cause the computer to perform a data deduplication process comprising:
setting, for a to-be-deduplicated data block, a pointer that previously pointed to the to-be-deduplicated data block to instead point to a corresponding to-be-reserved data block, the to-be-deduplicated data block and the to-be-reserved data block both containing identical data;
setting a virtual pointer to point to the to-be-deduplicated data block while the pointer continues to point to the to-be-reserved data block;
cancelling, in response to an available storage capacity reaching a predetermined value, virtual pointers of respective to-be-deduplicated data blocks to be reclaimed, and reclaiming storage spaces of the respective to-be-deduplicated data blocks to be reclaimed,
wherein when the virtual pointer pointing to the to-be-deduplicated data block is available, the to-be-deduplicated data block is directly accessed through the virtual pointer.

11. The computer program product according to claim 10, wherein the instructions, when executed by the computer, further cause the computer to: store the virtual pointer pointing to the to-be-deduplicated data block by adopting, in a dual-pointer structure, a structure similar to that of the pointer set as the pointer pointing to the corresponding to-be-reserved data block.

12. The computer program product according to claim 10, wherein the instructions, when executed by the computer, further cause the computer to set, for the virtual pointer pointing to the to-be-deduplicated data block, a virtual pointer indication bit that indicates whether the virtual pointer is available.

13. The computer program product according to claim 12, wherein the cancelling virtual pointers of respective to-be-deduplicated data blocks to be reclaimed includes setting the virtual pointer indication bit as a value indicating that the virtual pointer is unavailable.

14. The computer program product according to claim 10, wherein the instructions, when executed by the computer, further cause the computer to:
set, for a pointer pointing to a respective data block, a sharing count bit indicating the number of other data blocks sharing the pointer,
wherein if a value of the sharing count bit is greater than 0 and the virtual pointer is unavailable, a new storage resource is allocated, when performing a write operation on a data block, for the write operation, and the pointer of the data block for the write operation is set to be pointed to the data block stored with the newly allocated storage resource.

15. The computer program product according to claim 14, wherein when allocating the new storage resource to the write operation, one of the following operations is performed if there is no available free storage resource:
reclaiming continuous data blocks with a relatively long length among reclaimable resources, so as to be allocated to the write operation; and
reclaiming continuous data blocks with a length better matching the write operation among the reclaimable resources, so as to be allocated to the write operation.

16. The computer program product according to claim 10, wherein the instructions, when executed by the computer, further cause the computer to:
determine all reclaimable to-be-deduplicated data blocks, and
determine a part of all reclaimable to-be-deduplicated data blocks as the to-be-deduplicated data blocks to be reclaimed.

17. The computer program product according to claim 16, wherein the part of all to-be-deduplicated data blocks includes continuous data blocks in all of the to-be-deduplicated data blocks.

* * * * *